Dec. 13, 1960     E. A. EDDY     2,964,209
HIGH STRENGTH CASING
Filed Aug. 25, 1958     2 Sheets-Sheet 1

INVENTOR.
EDWYN A. EDDY
BY
*John J. Sullivan*
ATTORNEY

Dec. 13, 1960

E. A. EDDY 2,964,209

HIGH STRENGTH CASING

Filed Aug. 25, 1958

INVENTOR.
EDWYN A. EDDY
BY
John J. Sullivan
ATTORNEY

United States Patent Office 2,964,209
Patented Dec. 13, 1960

2,964,209

HIGH STRENGTH CASING

Edwyn A. Eddy, Syosset, N.Y., assignor to Republic Aviation Corporation, Farmingdale, N.Y., a corporation of Delaware Filed Aug. 25, 1958, Ser. No. 756,871

10 Claims. (Cl. 220—3)

This invention relates generally to pressure vessels and more particularly to a casing for a rocket motor whereby maximum strength-to-weight ratio is obtained.

In rocket motor applications fabrication of the casing is considerably more critical than in other pressure vessel applications. This is occasioned by aerodynamic factors involved in rocket operation wherein the casing forms the fuselage and the propellant gives thrust and, to some extent, direction to the rocket's flight. The internal and external surfaces of the casing, therefore, become important and should be relatively clean and smooth, if maximum operating efficiency is to be obtained.

At the same time the increase in the range and scope of operation of rockets and ballistic missiles requires additional or more powerful propellants and, therefore, larger and stronger casings to withstand the increased internal forces and pressures. This gives rise to many manufacturing problems. It has been proposed to manufacture such casings from relatively small segments or short sections welded one to the other to form the ultimate casing. For additional radial or hoop strength the casing so constructed may be reinforced by external wrappings, usually helically wound. In order to reduce weight and yet attain a high degree of strength, the casing per se has sometimes been fabricated of helically wound material. Following this practice, the welded segments have proven ineffective to withstand the forces and pressures of present day rocket motors, and external wrappings create additional manufacturing problems, particularly in the connection of end sections or closures.

Another practice, in order to get additional strength at a relatively low weight penalty, has been the heat treating of the case as a complete unit after welding. When heat treated, however, shrinkage and warpage of the steel occurs which is virtually impossible to eliminate or control, resulting in casings or casing sections that are not uniform. In addition, as the size of the unit to be so treated increases, prohibitive costs result due to additional handling difficulties and the special type of heating chambers or furnaces required.

The present invention proposes to overcome the foregoing as well as other problems presently existing in the fabrication of rocket casings. At the same time the instant casing has a better strength-to-weight ratio than those heretofore possible, being further characterized by aerodynamically clean external and internal surfaces.

In contrast to prior casings and particularly those employing helical wrappings referred to above, the end closures or walls of the present casing are readily attached and integrally joined to the main body to form an equally strong continuation thereof.

With the above and other objects in view, as will be apparent, this invention consists in the construction, combination and arrangement of parts, all as hereinafter more fully described, claimed and illustrated in the accompanying drawings, wherein:

Fig. 1A is a fragment of the longitudinal section shown in Fig. 1 at an enlarged scale;

Fig. 1B is a similar fragmentary section to show a different means by which the several segments comprising the rocket casing may be interconnected;

Figure 1:
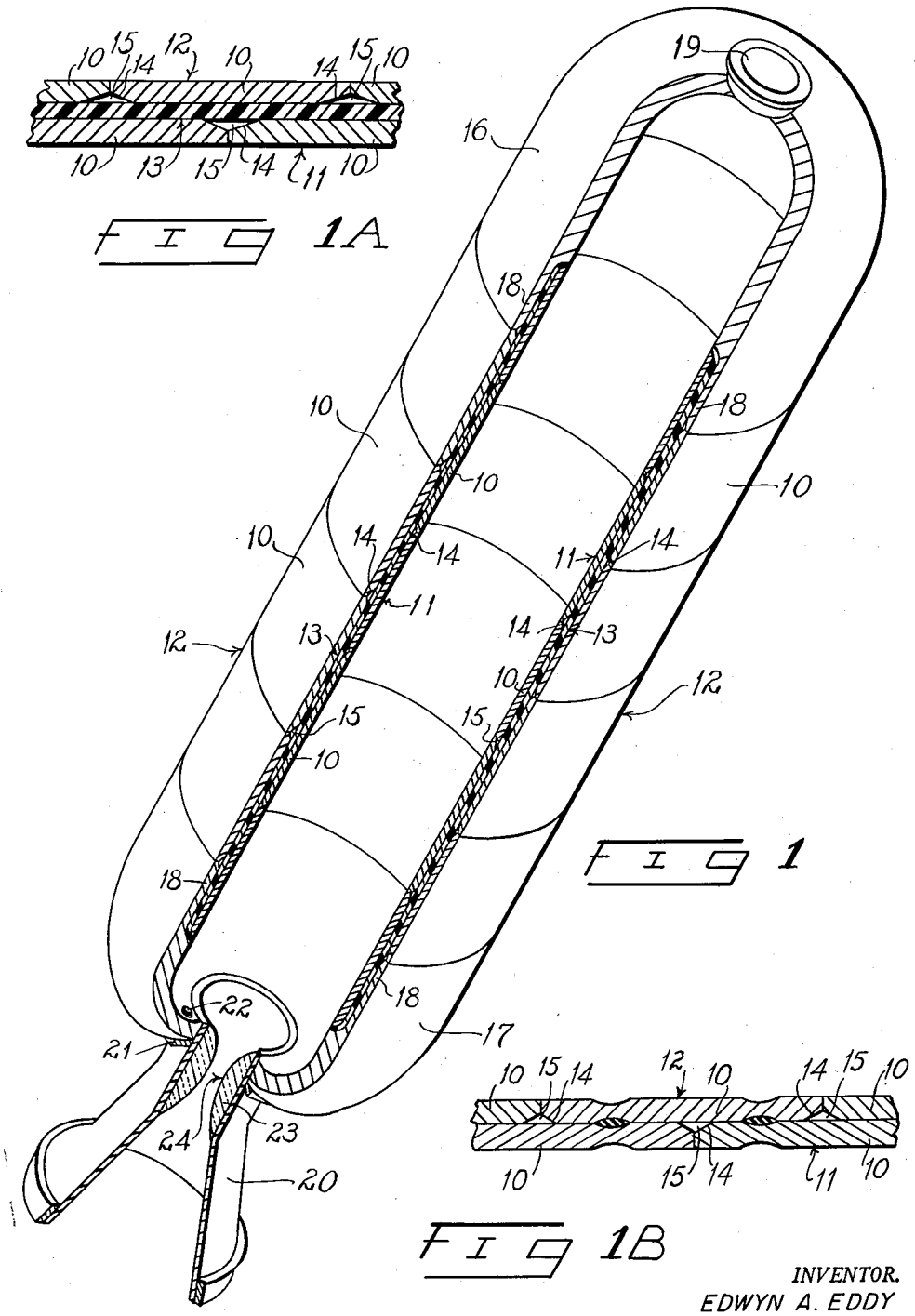
Fig. 1 is a perspective elevation partly in longitudinal section of a rocket casing constructed in accordance with the teachings of this invention.

Referring more specifically to Fig. 1 of the drawings, 10 designates a plurality of relatively narrow, annular bands or rings disposed one adjacent the next in axial alignment and substantial abutment at their associated edges to form a cylinder 11. Overlying the cylinder 11 thus formed is a similarly constructed outer cylinder 12 of equal wall thickness, the inner diameter of the outer cylinder 12 being larger than the outer diameter of the inner cylinder by a small fraction whereby a slight clearance or space 13 is formed between the adjacent surfaces thereof.

The adjacent edges of the rings 10 of the outer cylinder 12 are disposed out of alignment with the adjacent edges of the rings 10 of the inner cylinder 11. Preferably, the edges of the rings 10 of one of the cylinders are located midway between the edges of the rings 10 of the other cylinder and any number of pairs of layers or courses of rings 10 may thus be employed, for reasons to become more apparent. When so assembled and secured the co-extensive cylinders 11 and 12 form the main body of the present casing.

The faying or adjacent surfaces of all the rings 10 of the cylinders 11 and 12 are preferably secured one to the other by a bonding adhesive. The particular adhesive employed for this purpose will depend on the material of the cylinders 11 and 12 and the strength characteristics required of the ultimate casing. For example, any organic adhesive such as nitrile-phenolic, vinyl-phenolic, etc., may be employed.

In higher temperature applications, i.e., where the rocket casing is exposed in use to high heat, an inorganic adhesive material such as a soluble silicate, may be used for this purpose. In any event, the present rocket casing is not to be limited to any particular material by which a bond is effected between the faying surfaces of the rings 10 which comprise the cylinders 11 and 12.

In many cases it may even be preferred to connect the faying surfaces of the several rings 10 of the cylinders 11 and 12 by means of mechanical or resistance (spot) welding. Where a positive connection is not essential, sufficient engagement of the rings 10 of each cylinder 11 and 12 one with the next may be accomplished by interlocking action between the rings, as for example, by meshing serrations 13' (Fig. 3) formed on adjacent surfaces of the rings for this purpose. The important thing, and this is a salient feature of the invention, is that each ring 10 of both cylinders 11 and 12 does not rely on an edge to edge connection with the next adjacent ring of that cylinder but on a connection between a ring of one of the cylinders and the adjacent ring of the other cylinder in the area of the overlap thereof.

In order to facilitate assembly of the cylinders 11 and 12, particularly where bonding adhesive is employed for interconnection of the rings 10, the opposed edges of each ring 10 is chamfered or beveled, as at 14, to create additional localized clearance 15 between the ultimate cylinders. This serves to prevent an excess wiping of the bonding adhesive from the surfaces during the assembly.

Each of the rings 10 is preferably made in one continuous, unbroken piece, i.e., seamless. However, if desired or required, each ring 10 may be formed from sheet stock rolled to the proper diameter and butt-welded (flash, fusion, etc.) at the adjoining ends. The weld may be mechanically hardened, as by cold rolling, hammered, forged, etc., in order to reduce the grain composition thereof and properly orient it to thereby improve the strength property of the ultimate ring in the area thereof adjacent the weld. The weld may then be ground and the ring heat treated and sized for assembly as described.

Figure 4:
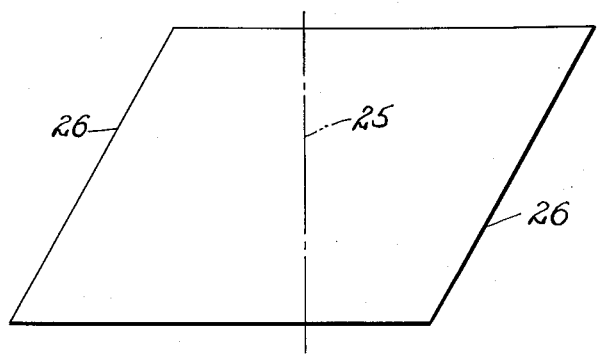
Fig. 4 is an elevation of one segment of the casing prior to the forming thereof to ultimate shape.

Further improvement in the ultimate casing may be obtained where the sheet stock method is employed in the manufacture of the rings by scarfing, i.e., cutting the opposed ends of the sheet at corresponding angles relative to the longitudinal edges of the sheet, prior to rolling the sheet to the proper diameter. This is illustrated in Fig. 4 where the numeral 25 designates the centerline of the ultimate ring and 26 the corresponding scarfed edges to be brought together into abutment and welded. The angle of the scarf 26 in each case will be determined by computations for optimum load carrying capability, as will the relative location of the scarfs 26 of the several rings 10 making up the particular casing.

The foregoing construction takes maximum advantage of the known fact that the hoop or radial stresses in the walls of the rocket casing are approximately twice the longitudinal stresses. Thus, the fabrication of the casing in pairs of concentric cylinders 11 and 12 of equal thickness is substantially equal in hoop strength to prior casings having single or laminated walls of the same overall thickness. On the other hand, only a single cylinder wall thickness carries the load at the joints of the rings 10 in the longitudinal direction. The connection of the cylinders 11 and 12 one to another across their overlapping ends serves to transfer the longitudinal load from one cylinder to the other across the entire length of the casing.

Following the foregoing construction of the main body of the present casing, one of the cylinders 11 or 12 terminates short of the other. In the preferred construction, the outer cylinder 12 terminates short of the inner cylinder 11 at each end of the casing. An end segment 16 and 17 having a marginal edge portion 18 of reduced thickness overlaps each projecting end portion of the cylinder 11 or 12 whereby the external and internal surfaces thereof form a smooth and uninterrupted continuation of the corresponding surfaces of the main body of the casing. The faying surfaces of the end segments and cylinder 11 or 12 are secured or bonded one to the other in the same manner as the several rings 10 already described.

Each of the end segments 16 and 17 is formed in the shape of a cup and constitutes a substantial end closure on the casing. The base wall of each segment is pierced centrally by an aperture to receive igniter and nozzle means, respectively. Neither the igniter and nozzle means, per se, nor the method of attachment thereof to the rocket casing forms any part of the present invention. Any known means and method may be employed. For purposes of illustration, a simple igniter fitting 19 is shown connected to or press-fitted in the nose or head segment 16 of the casing. Similarly, a conical exhaust nozzle 20 is connected to the aft segment 17 of the rocket casing.

A peripheral flange 21 may be provided on the nozzle 20 for abutment against the outer surface of the base of the segment 17 defining the aperture therein, and releasable fastening means such as a plurality of bolts 22 passing through the flange 21 and segment 17 additionally secure the nozzle to the casing. The internal surface of the nozzle 20 is lined with high heat resistant material 23 which defines a cross sectional area 24 of reduced diameter constituting the throat of the rocket.

Figure 2:
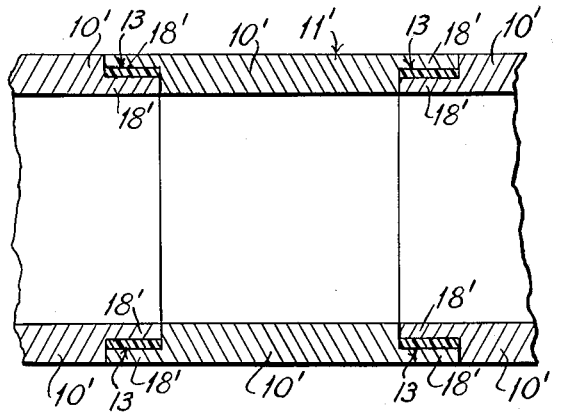
Fig. 2 is a fragment of a rocket in longitudinal section to show an alternate form of construction.

As an alternate to the ring construction hereinabove described, Fig. 2 shows a modified version of the invention. In this form the casing comprises a single cylinder 11′, as opposed to the concentric cylinders 11 and 12, formed by a plurality of annular bands or rings 10′ placed substantially in end to end abutment. The opposed marginal edge portions of each ring 10′ may be of reduced thickness, as at 18′, or scarfed adjacent corresponding edges to overlap one another whereby connection or engagement thereof is accomplished in the same manner as described in the case of the concentric cylinders 11 and 12.

In order to construct the rocket casing as above described, the annular bands or rings 10 or 10′ as the case may be are individually formed or produced. All of these rings 10 or 10′ are substantially identical one to the other except as to the two diameters in the case of the rings 10. The end segments or heads 16 and 17 are separately constructed with the marginal edge portions 18 formed or produced therein. The several elements, viz., rings 10 or 10′ and heads 16 and 17, are then cleaned, preferably by a non-chemical process such as, for example, vapor degreasing followed by "liquid honing" or "vapor blasting" leaving the surfaces thereof mechanically etched.

After the several elements have been dried, they are ready to be assembled to form the ultimate rocket casing. Where a bonding adhesive or synthetic resin is employed, the surfaces to be joined are coated with the adhesive. Beginning at either head 16 or 17, the annular bands 10 or 10′ are then disposed in place. Where bands 10 are employed an inner and outer band is alternately arranged until the opposed head is ultimately attached.

If a bonding adhesive has been applied to the faying surfaces, the assembly so arranged is then allowed to cure. Depending upon the particular adhesive material employed, this curing operation may be at room temperature or under elevated temperature application. Where room temperature curing is employed, assembly of the several elements comprising the casing immediately follows the application of the bonding adhesive. When, on the other hand, high temperature curing is employed, the assembly may be made at any time subsequent to the application of the bonding adhesive without affecting the structural integrity of the end article.

When the faying surfaces of the rings 10 or 10′ are to be connected in a manner other than bonding, as set forth hereinabove, the arrangement of the rings in the assembly is the same. Such arrangement may be made at any time after cleaning and drying the several elements. Where the faying surfaces are joined by interlocking the serrations 13′ thereof, this is accomplished by cooling the smaller rings 10 and heating the larger rings 10. Thus, shrinkage occurs on the one hand and expansion on the other whereby the coacting rings may be disposed one over the other and allowed to set or return to their original temperature. When this occurs the serrations 13′ of the rings will be in mesh.

Figure 3:
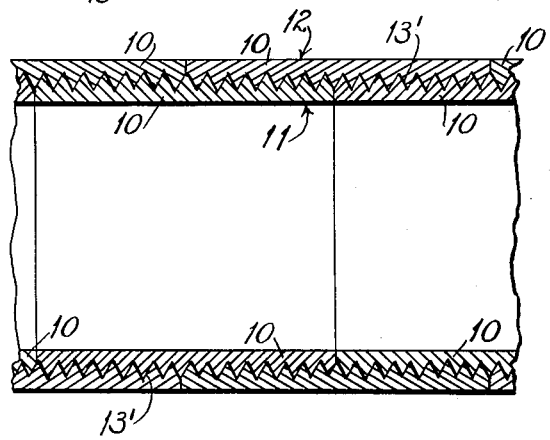
Fig. 3 is a similar view of still another form of construction.

It is to be understood that where concentric cylinders 11 and 12 are employed space 13 is only created when the cylinders are to be bonded by adhesive material (Fig. 1A). When the welding or interlocking connections of the cylinders 11 and 12 as above set forth is preferred, the faying surfaces of the cylinders are in substantial abutment one against the other (Figs. 1B and 3).

What is claimed is:

1. A casing for pressure vessels comprising a pair of concentric cylinders, each formed by a plurality of annular rings of equal wall thickness disposed in end to end abutment, one of said cylinders extending beyond the end of the other cylinder at each end thereof, the opposed edges of each ring being chamfered at the surface thereof adjacent the other cylinder, means forming a positive connection between the faying surfaces of the cylinders, a head enclosing each end of the concentric cylinders, the marginal edge portion of each head being of reduced wall thickness and substantially equal to that of each cylinder and overlapping the extending cylinder end aforesaid and in substantial abutment with the end of said other cylinder whereby the external and internal surfaces of the casing are smooth and unbroken, and means connecting each head and associated cylinder end across the overlap aforesaid..

2. A casing for pressure vessels comprising pairs of concentric cylinders, each cylinder formed by a plurality of annular rings disposed in end to end abutment, the abutting end of the rings of one of said cylinders being located between the abutting end of the rings of the next adjacent cylinder, a connection of synthetic resin between the adjacent surfaces of the cylinders, and a head enclosing the ends of all the concentric cylinders, said head overlapping and being bonded by synthetic resin to the marginal edge portion of one of said cylinders.

3. A casing for pressure vessels comprising a pair of concentric cylinders each formed by a plurality of annular bands disposed in end to end abutment, the abutting ends of the bands of each of said cylinders being located substantially midway between the abutting ends of the bands of the other cylinder, a head formed with a recessed marginal edge portion to overlap each end of the concentric cylinders, and a connection of synthetic resin between the faying surfaces of the cylinder ends and between the faying surfaces of the cylinders and heads.

4. A casing for pressure vessels comprising a main body formed by a plurality of annular rings disposed in unconnected end to end abutment and having marginal edge portions overlapping one another, heads enclosing the ends of the main body having marginal edge portions overlapping the marginal edge portions of the end rings of said main body, and connecting means between each of the overlapping edge portions aforesaid.

5. A casing for pressure vessels comprising a cylindrical main body formed by a plurality of annular segments, the ends of which define edge portions and adjacent marginal surfaces which abut one against the next to thereby create smooth and continuous external and internal surfaces on said main body, heads enclosing the ends of the main body having ends complemental to said ends of the last segments of the main body, and connecting means operative transversally relative to the casing to secure the several segments one to another and the last segments to the respective heads, the abutting end surfaces of the several segments and heads being unconnected.

6. A casing for pressure vessels comprising a plurality of annular segments having ends defining surfaces which are unconnected and abut one against the next and side surfaces that overlap upon such abutment, two of said segments being closed at one end and constituting heads at opposed ends of the casing, and positive connecting means between the overlapping surfaces only.

7. A casing as described in claim 6 wherein said connecting means consists of a plurality of spot welds.

8. A casing for pressure vessels comprising a plurality of annular segments having ends defining surfaces which are unconnected and abut one against the next and side surfaces adjacent said ends that overlap upon such unconnected abutment, two of said segments being closed at one end and constituting heads at opposed ends of the casing, and a connection of adhesive material between said overlapping side surfaces.

9. A casing for pressure vessels comprising a plurality of annular segments having ends defining edge portions which abut one against the next and surfaces that overlap upon such abutment, two of said segments being closed at one end and constituting heads at opposed ends of the casing, and complemental serrations formed on and projecting from said overlapping surfaces and in interlocking engagement whereby the several segments are secured against relative movement.

10. A casing for pressure vessels comprising a pair of concentric cylinders each formed by a plurality of annular rings disposed in edge to edge abutment, the abutting edges of the rings of one of said cylinders being located between the abutting edges of the rings of the other cylinder whereby the several rings of each cylinder overlap the adjacent rings of the other cylinder with a portion of the end ring of one of said cylinders projecting beyond the end ring of the other cylinder, complemental interlocking projections on the overlapping portions of the rings for the immovable connection thereof, and heads enclosing the opposed ends of the concentric cylinders, each of said heads overlapping and being connected to the projecting portion of each cylinder in the same manner as aforesaid.

References Cited in the file of this patent

UNITED STATES PATENTS

| | | |
|---|---|---|
| 646,459 | Place | Apr. 3, 1900 |
| 1,925,118 | Stresau | Sept. 5, 1933 |
| 2,285,554 | Austin | June 9, 1942 |
| 2,541,371 | Kops | Feb. 13, 1951 |
| 2,715,598 | Rees et al. | Aug. 16, 1955 |